United States Patent

Huber

[15] 3,662,123

[45] May 9, 1972

[54] CARTRIDGE ADAPTOR

[72] Inventor: William B. Huber, Park Forest, Ill.

[73] Assignee: Motorola, Inc., Franklin Park, Ill.

[22] Filed: June 18, 1970

[21] Appl. No.: 47,545

[52] U.S. Cl. ....................179/100.2 Z, 179/100.11, 274/4 G

[51] Int. Cl. ....................G11b 5/00

[58] Field of Search................179/100.11, 100.22; 274/4 B, 274/4 C, 4 G; 226/181; 242/192, 201

[56] References Cited

UNITED STATES PATENTS

| | | | |
|---|---|---|---|
| 3,531,127 | 9/1970 | Harper | 179/100.2 Z |
| 3,533,633 | 10/1970 | Wilder | 242/201 |
| 3,475,563 | 10/1969 | Papst | 242/198 |

*Primary Examiner*—Robert L. Richardson
*Assistant Examiner*—Richard P. Lange
*Attorney*—Mueller and Aichele

[57] ABSTRACT

A converter cartridge is arranged to receive a two track cartridge of prerecorded tape and cause reproduction of the tape therein through an eight track stereo tape player. Drive means are provided within the converter cartridge to couple tape transport power from a capstan within the eight track stereo tape player to the drive wheel within the two track cartridge. The drive means includes a first drive wheel engaging the capstan and a pivotal idler drive wheel intermediate the first drive wheel and the two track cartridge to engage the drive wheel only when a two track cartridge is inserted into the converter cartridge. Also, the intermediate idler wheel has portions of different diameter to compensate for friction losses.

3 Claims, 9 Drawing Figures

Inventor
WILLIAM B. HUBER
BY
Mueller & Aichele
ATTYS.

Inventor
WILLIAM B. HUBER
BY
Mueller & Aichele
ATTYS.

Inventor
WILLIAM B. HUBER
BY
Mueller & Aichele
ATTYS.

CARTRIDGE ADAPTOR

BACKGROUND OF THE INVENTION

This invention relates to the field of tape cartridges used in eight track stereo tape players and has particular utility for adapting two track cartridges, such as Playtape cartridges, or the like, for reproduction in such eight track stereo tape players.

At present, stereo tape players are relatively well-known for use in automobiles, and are becoming more popular in home entertainment centers. However, before the stereo eight track tape cartridges or tape players were introduced into the market place, a relatively large market of two track cartridge tape players was introduced, and as a result, people purchased two track players and two track cartridges. Furthermore, two track cartridges are still available for purchase and they are smaller than the stereo eight track tape cartridge and therefore occupy less space.

SUMMARY OF THE INVENTION

Accordingly, it is an object of this invention to provide an improved converter cartridge for receiving a cartridge having two track tape therein and reproducing such tape in a tape player arranged to use cartridges having the same general configuration as the converter cartridge.

Briefly, the converter cartridge, sometimes referred to herein as the adaptor cartridge, is formed of a housing having a configuration substantially identical to that of a conventional eight track stereo tape cartridge for insertion into such eight track stereo tape player. However, the rear wall portion of the housing is provided with an entryway to receive a two track cartridge. Mounted within the housing are transport drive wheels to transport the drive motion from the capstan within the tape player to that of the tape within the two track cartridge. Also, within the housing are pick-up means and audio reproducing means to amplify the audio signal information from the two track cartridge. The audio reproducing means is connected to a magnetic transducer device to generate a varying magnetic field which is induced into the tape pick-up head within the eight track stereo tape player. This, then, causes audio reproduction of the sound signals on the tape within the two track cartridge. The converter cartridge is completely self-contained in that it houses its own power supply, preferably a small battery, or the like, to supply power to a printed circuit audio amplifier. Suitable switch means is provided on the converter cartridge to turn on and off the amplifier located therein and to switch between two tape pick-up means.

Many objects, features and advantages of this invention will become more fully realized and understood from the following detailed description when taken in conjunction with the accompanying drawings wherein like reference numerals throughout the various views of the drawings are intended to designate the same or similar elements or components.

DESCRIPTION OF THE PREFERRED EMBODIMENT

Figure 1:
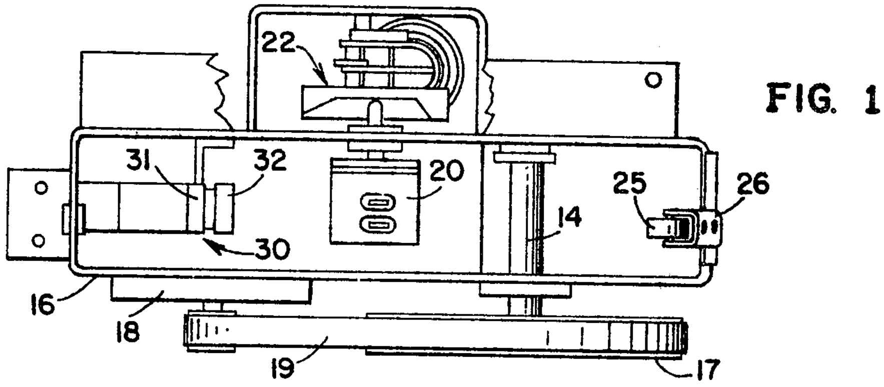
FIG. 1 is a front elevational view of one type of tape player apparatus which can receive the converter cartridge of this invention.
Figure 2:
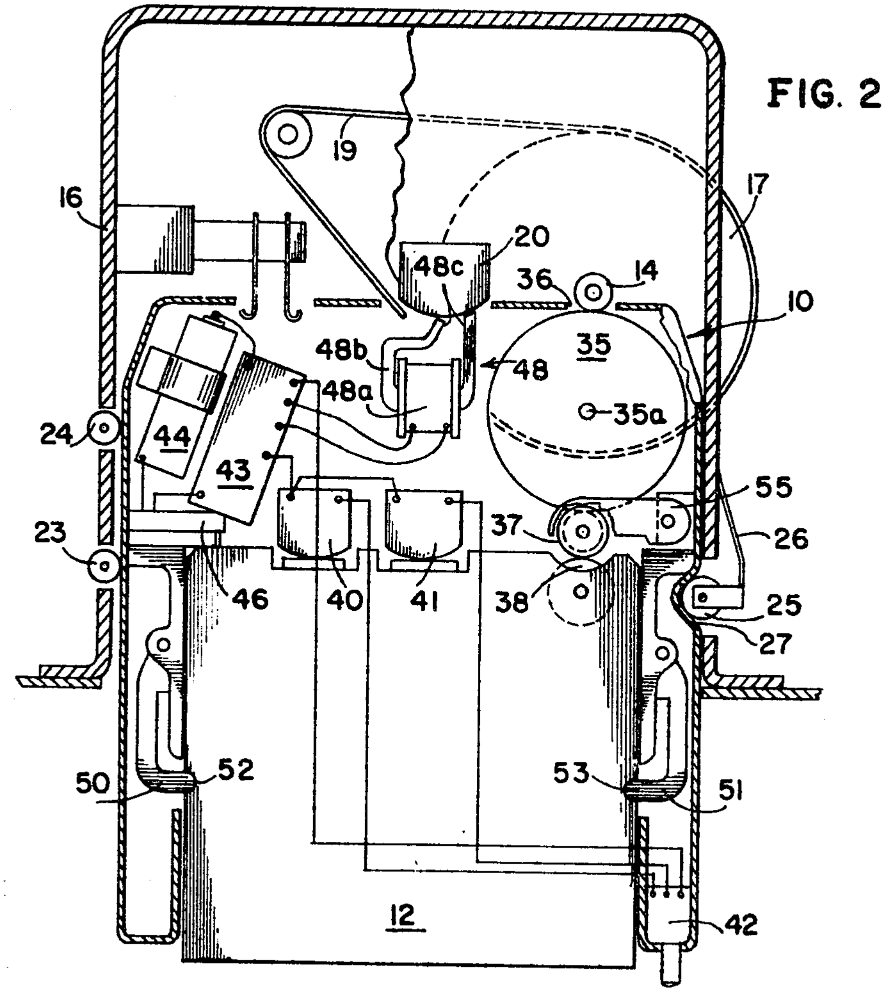
FIG. 2 is a top sectional view of a portion of the tape player of FIG. 1 with the converter cartridge of this invention shown in full engagement with the tape player.
Figure 3:
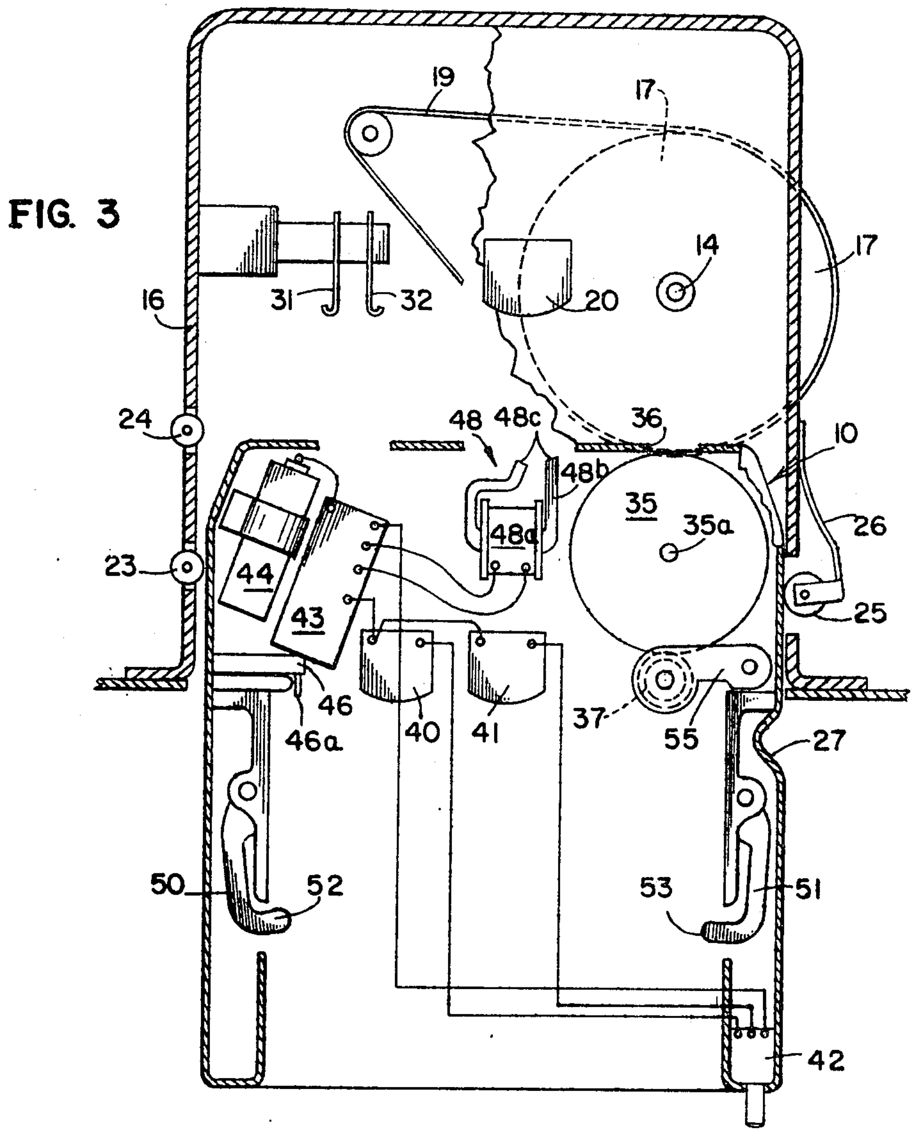
FIG. 3 is a top sectional view similar to that of FIG. 2 but with the converter cartridge shown only in a partially inserted condition.

Referring now to the drawings, FIGS. 1, 2 and 3 show a tape player apparatus of the type to receive and play a standard eight track stereo cartridge as is well-known in the art. However, in accordance with this invention, the FIGS. 2 and 3 illustrate a converter cartridge 10 inserted into the tape player. The converter cartridge is inserted into the tape player to convert the same for use with cartridges of a different type, preferably two track cartridge type, as indicated by the two track cartridge 12. The audio signal information from the tape within the two track cartridge is reproduced solely within converter cartridge 10, but main driving power to transport the tape is introduced therein by the capstan drive 14 of the tape player.

For a better understanding of this invention, additional environment of the tape player will be set forth, it being understood that any suitable tape player arrangement can be used to incorporate the converter cartridge of this invention. Here the tape player includes a cartridge receptacle housing 16, preferably of stamped metal construction, having an opening formed at one end thereof to receive the converter cartridge 10, or a regular stereo eight track cartridge, whichever the case may be. The capstan drive 14 extends into the housing 16 and is rotated by means of a drive wheel 17 fastened thereto which, in turn, is driven by a direct current motor 18 via a drive belt 19.

A two channel magnetic pick-up head 20 is mounted within the housing 16 to reproduce simultaneously the two separate channels of a stereophonic sound tape recording. The tape head 20 is actuated or shifted to various locations within the range of the width of the magnetic tape passing the same by means of an actuating mechanism 22 including suitable relay actuator and cam means. The positioning mechanism 22 forms no part of this invention and any suitable device to accomplish the result can be used.

A pair of guide rollers 23 and 24 are formed on one side of the housing 16 while a resiliently mounted guide and retainer roller 25 is fastened to the housing 16 by a spring member 26. The retainer roller 25 engages the notch 27 formed on the side of the converter cartridge or other standard cartridge housing, as is well-known in the art.

The tape player may include other conventional items, such as an end-of-tape sensing switch 30, consisting of a pair of contactors 31 and 32, spaced apart, to be bridged by a conductive metal foil portion of the tape within a standard cartridge to cause actuation of the positioning mechanism 22 and shift the position of the magnetic tape head 20. However, since the converter cartridge 10 does not have a tape passing over the conductors 31 and 32, no automatic shifting of the location of the tape head 20 will occur when reproducing tapes from a two track cartridge and audio reproduction will occur no matter what position the tape head 20 is in.

Figures 5, 6, 7:
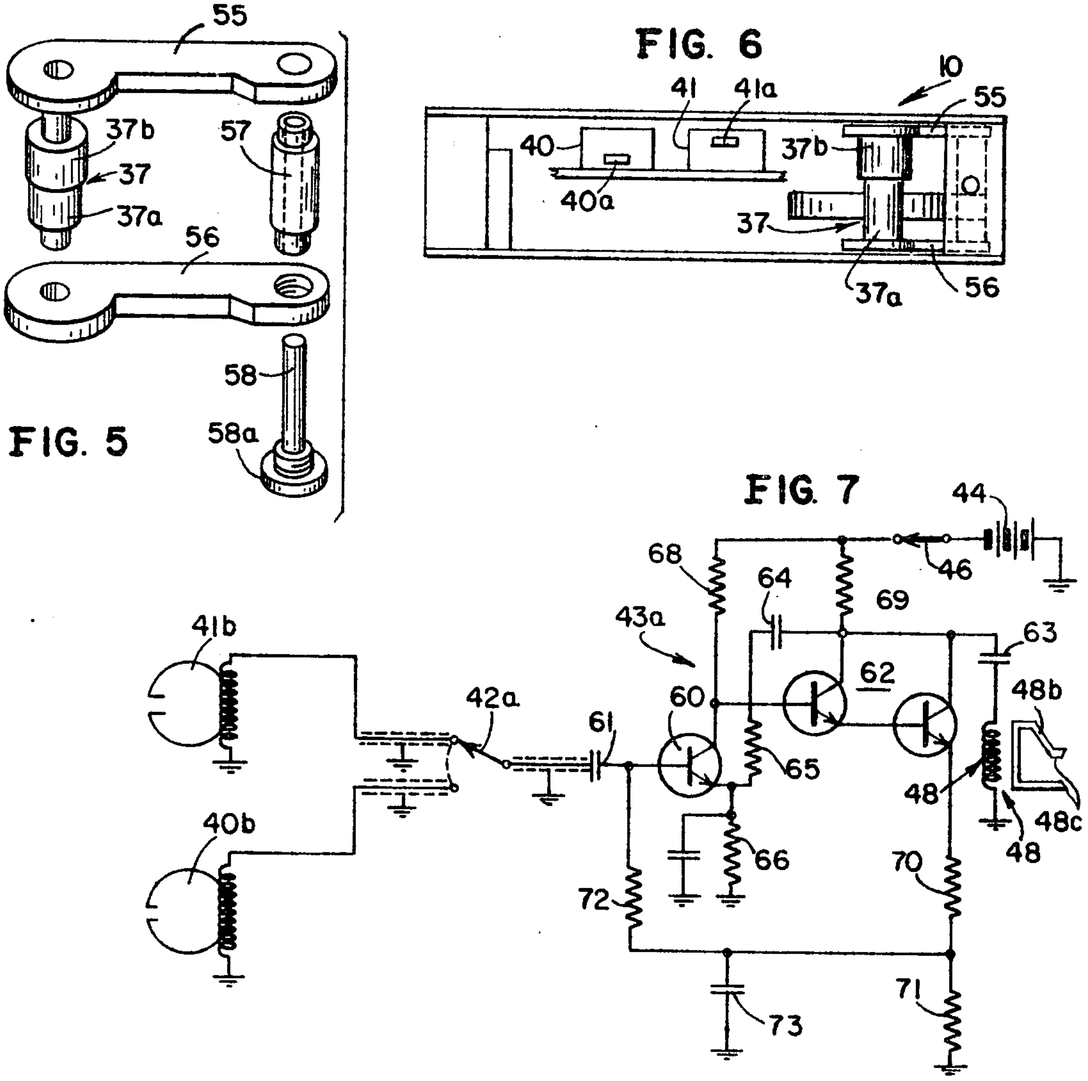
FIG. 5 is an expanded perspective view showing a pivotal connecting device for supporting an idler wheel having portions of different diameters used in the converter cartridge of this invention.
FIG. 6 is an end elevational view of the converter cartridge of this invention showing the entryway into which a cartridge is inserted to adapt the same for use with a tape player for playing cartridges of a different type.
FIG. 7 is a schematic diagram of an audio amplifier and signal driver circuit used in the converter cartridge of this invention.

More specifically, FIGS. 2, 3 and 6 illustrate the detailed construction of the converter cartridge 10. FIG. 3 shows the converter cartridge partially inserted into the tape player and FIG. 2 shows the converter cartridge fully inserted so that a main drive wheel 35, which rotates about a fixed axis 35*a*, has the periphery thereof engaged with the capstan 14 through an opening 36 in the converter cartridge 10. An idler wheel 37 is free floating or may be biased away from the main drive wheel 35 so that pressure is not applied thereto when the converter cartridge 10 is not in use. This eliminates the possibility of a flat spot from forming at the periphery of either main drive wheel 35 or the idler wheel 37. However, when the converter cartridge 10 is run home within the tape player, as seen in FIG. 2, and at the same time a two track cartridge 12 is inserted into the converter cartridge 10, the idler wheel 37 engages the main drive wheel 35 and a tape drive wheel 38 within the two track cartridge 12 firmly to apply pressure to the drive wheels of the power train and the capstan 14.

FIG. 6 shows a pair of magnetic tape heads 40 and 41, each having tape reproducing portions 40*a* and 41*a* displaced vertically from one another so as to come in contact with two separate channel portions or tracks on the tape within the two track cartridge. Only one of the magnetic tape heads 40 or 41 is operated at any given instance by a manually operated switch 42 preferably located near the extended end of the converter cartridge 10 to be manipulated by the user thereof. The output of the magnetic head 40 or 41 is applied to the input of an amplifier circuit board 43. The power for the amplifier board 43 preferably is contained within the converter cartridge 10 by means of a battery 44 which applies power to the amplifier board 43 only in response to actuation of a limit switch device 46, or the like. The switch 46 is actuated when the two track cartridge 12 is inserted to engage the plunger member 46*a* thereof. Therefore, power is connected to the amplifier board 43 only when a two track cartridge 12 is inserted into the converter cartridge 10. A second switch connected in series with the switch 46 may be used and actuated in response to the converter cartridge 10 being fully in its locked-in position within the tape player. Therefore, power will be applied to the amplifier circuit board 43 only when both the converter cartridge 10 is inserted in the tape player and a two track cartridge 12 is inserted into the converter cartridge 10.

Audio signal information is amplified and applied as alternating current voltage signals to a magnetic transducer 48 consisting of a coil 48*a* and a core member 48*b* having an air gap 48*c* formed at one end thereof. The gap 48*c* is arranged to be in substantial registry with both of the pick-up portions of the magnetic tape head 20 so that no matter what position the tape head 20 is in at the particular time the converter cartridge 10 is inserted a magnetic flux field will be induced into the head 20 by the magnetic transducer 48.

The converter cartridge 10 includes gripping members 50 and 51 which have inwardly turned portions to engage corresponding notches 52 and 53, respectively, on the two track cartridge 12 to hold the same in a locked-in position, as best seen in FIG. 2.

In accordance with one aspect of this invention, the idler wheel 37 consists of two different diameter portions 37*a* and 37*b* to provide a slight speed increase in the transport of tape within the two track cartridge 12. This is necessary as a result of friction losses which occur from the transmission of power from the capstan 14 to the tape drive wheel 38. It has been discovered that approximately a 3 percent speed loss is noticed when using an idler wheel 37 of the same diameter as the capstan drive 14. However, in accordance with the preferred embodiment of this invention, the idler wheel 37 has the increased diameter portion 37*b* thereof increased sufficiently to compensate for this 3 percent friction loss. That is, the smaller diameter portion 37*a* engaging the main drive wheel 35 is substantially the same diameter as the capstan drive 14, while the enlarged diameter portion 37*b* is dimensioned so that the effective speed at the tape drive wheel 38 is the same as that of the capstan drive 14, thus taking into account the friction losses within the system.

Figure 4:
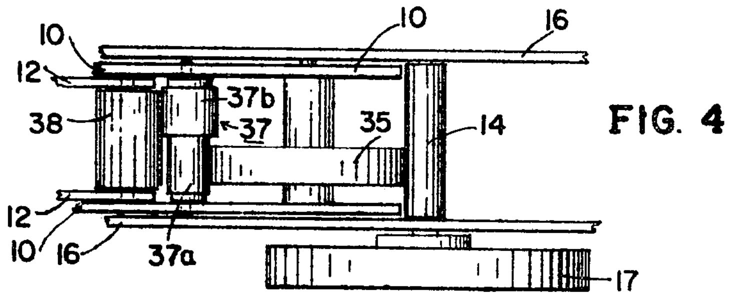
FIG. 4 is an elevational diagrammatic representation of the drive wheel train for transferring power from the capstan drive of the tape player to the tape drive wheel within the cartridge to be operated in the converter cartridge.

The drive wheel train of this invention is best illustrated in FIG. 4 which is a side sectional view taken through the gear train and showing the relative relationship between each of these drive wheels. Also, the idler wheel pivotal support structure is illustrated in FIG. 5 and provides means to keep the idler wheel 37 out of contact with the main drive wheel 35 when no two track cartridge is inserted. Here the idler wheel 37 is rotatably supported between a pair of link members 55 and 56 which, in turn are maintained spaced apart by a spacer 57 at the one end thereof. The entire assembly may be fastened together by a threaded pin 58 having a relatively thin head portion 58*a*.

FIG. 7 illustrates a schematic diagram of the audio amplifier circuit board 43 and is itself designated generally by reference numeral 43*a*. The selector switch 42 is indicated by the movable contactor 42*a* which selectively switches between respective ones of the magnetic pick-ups indicated schematically at 40*b* and 41*b*. The variable magnetic field induced into either of the pick-ups 40*b* or 41*b* is applied to the base electrode of a transistor 60 through a coupling capacitor 61. The transistor 60 amplifies the signal and applies it to a Darlington amplifier stage 62 which, in turn, applies the signal, in an amplified condition, to the coil winding 48*a* of the magnetic transducer 48. A capacitor 63 is interposed between the output of the Darlington circuit 62 and the coil 48*a*. Regenerative feedback is provided by a capacitor 64 connected in series with a resistor 65 which, in turn, is connected to the emitter of transistor 60 and a bypass bias network consisting of resistor 66 and capacitor 67. Load resistors 68 and 69 are connected in series with transistor 60 and Darlington 62, respectively, and to the power supply consisting of the battery 44. The switch 46 is the limit switch shown in FIGS. 2 and 3. The emitter electrode of the second transistor of the Darlington 62 is connected to one of the series resistors 70 and 71, which have their common circuit point connected back to the base electrode of transistor 60 via a resistor 72. A filter capacitor 73 is connected between the circuit point of resistors 70 and 71 and ground potential to shunt high frequency noise signals.

Figure 8:
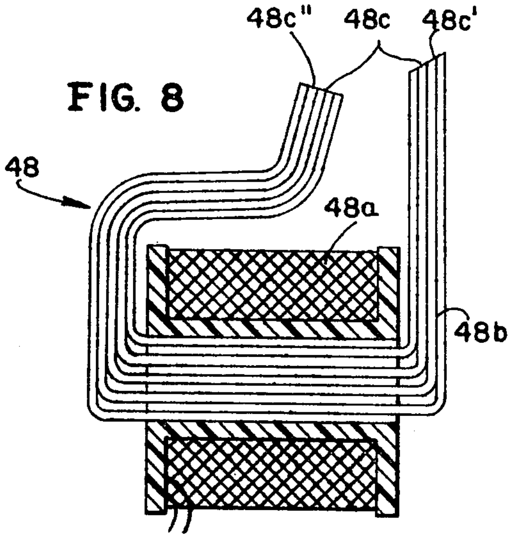
FIG. 8 is an enlarged sectional view of the magnetic transducer device within the converter cartridge to cause the signal on the tape within the cartridge inserted into the converter cartridge to be reproduced magnetically into the tape pick-up head of the tape player.

FIG. 8 illustrates an enlarged sectional view of the magnetic transducer 48 and shows the core portion 48*b* as being a laminate structure. The gap 48*c* has a cross-sectional configuration to have a portion 48*c'* in contact with the body of the magnetic head 20 within the tape player and a spaced portion 48*c''* which is to be slightly spaced from the magnetic head 20, but in registry with the respective pick-up head portions thereof to cause magnetic flux to be induced therein. To insure that the portion 48*c'* will be in contact with the pick-up head 20 and to compensate for slight differences in location between the pick-up head 20 and the transducer 48, the transducer 48 is resiliently mounted within the converter cartridge to be urged toward and against the pick-up head 20.

Although the preferred embodiment of the converter cartridge disclosed herein illustrates means to convert a monaural tape cartridge for use in a stereo tape player, the same results can be obtained by a cartridge to convert a monaural tape cartridge of one type for use in monaural tape player of another type. Similarly, the teaching of the illustrated embodiment of this invention can be used to convert a stereo tape cartridge of one type for use in a stereo tape player of another type.

Figure 9:
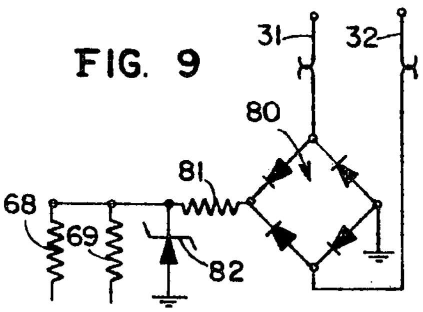
FIG. 9 illustrates a means of taking power from the tape player to operate the amplifier circuit within the converter cartridge of this invention.

FIG. 9 shows an alternate means of obtaining power for the converter cartridge. Here power is taken directly from the end-of-tape sensing switch electrodes 31 and 32. This power is applied to a bridge circuit 80 which assures that the proper polarity of voltage is applied to the amplifier circuit regardless of the polarity of the voltage at the electrodes 31 and 32. The voltage obtained from the bridge circuit 80 is applied through a resistor 81 to a zener diode 82 which serves as a voltage regulator to prevent over voltage from being applied to the amplifier circuit.

What has been described is a simple and effective converter cartridge used to play prerecorded tapes within a two track cartridge in a eight track stereo tape player without converting either the two track cartridge or the tape player.

I claim:

1. For use in a tape recorder player for playing a tape cartridge of a given type and having a cartridge receiving receptacle, a capstan for driving the tape in the given cartridge at a predetermined speed for playback and signal reproducing means, the combination comprising:

a converter cartridge formed and adapted for reception in said receptacle, said converter cartridge for receiving and playing back a cartridge of a different type having tape therein which must be driven at substantially the same speed as the tape in the given cartridge;

drive means carried in said converter cartridge, said drive means including a first wheel directly engageable with said capstan in the tape recorder player and second wheel means pivotally secured within said converter cartridge for movement to engage said first wheel only when a cartridge of a different type is inserted into the converter cartridge, said second wheel means having a circumferential portion thereof which does not contact said first wheel and which is dimensioned greater than the circumference of said capstan;

means carried in said converter cartridge for receiving a cartridge of a different type, and a tape drive wheel, said second wheel means positioned so said circumferential portion thereof engages said tape drive wheel with said converter cartridge positioned in the tape recorder player and said cartridge of a different type is inserted therein to transport a tape record within said cartridge of a different type at substantially the same speed said tape in said given cartridge is driven in the tape recorder player; and means within said converter cartridge for reproducing signals from said tape record, and coupling means for connecting said signals from said converter cartridge signal reproducing means to the signal reproducing means within the tape record player.

2. The apparatus of claim 1 wherein said second wheel means is pivotally mounted within said converter cartridge to be free of said first wheel until such time as a cartridge of a different type is inserted into the converter cartridge to cause said second wheel means to engage with said first wheel thereby reducing the possibility of said first or second wheel means developing a flat spot with the tape player recorder not being in use.

3. The apparatus of claim 1 wherein said second wheel means includes a first wheel portion for engaging said first wheel and having a diameter substantially the same as the diameter of the tape player recorder capstan and a second wheel portion coaxially mounted with said first wheel portion which has a diameter greater than the diameter of the tape recorder player capstan, said first wheel portion engages said first wheel and said second wheel portion engages said tape drive wheel with said converter cartridge positioned in the tape recorder player to drive the same at an effective speed substantially equal to the capstan drive speed of the tape recorder player, said second wheel portion thereby compensating for the friction loss in the transmission of power from the capstan to said tape drive wheel in said converter cartridge.

* * * * *